(12) United States Patent
Culbert et al.

(10) Patent No.: US 7,193,032 B2
(45) Date of Patent: Mar. 20, 2007

(54) CONTROLLING THE CRYSTALLIZATION OF POLYESTERS BY MEANS OF THEIR WATER CONTENT

(75) Inventors: Brent-Allan Culbert, Wil (CH); Andreas Christel, Zuzwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 10/837,571

(22) Filed: May 4, 2004

(65) Prior Publication Data

US 2005/0004341 A1    Jan. 6, 2005

Related U.S. Application Data

(63) Continuation of application No. PCT/CH02/00504, filed on Sep. 12, 2002.

(30) Foreign Application Priority Data

Oct. 8, 2001  (DE) ................................. 101 49 474

(51) Int. Cl.
 *C08F 6/00* (2006.01)
(52) U.S. Cl. .................... 528/480; 34/580; 34/586; 34/589; 34/590
(58) Field of Classification Search .............. 34/580, 34/586, 589, 590; 528/480
See application file for complete search history.

(56) References Cited

U.S. PATENT DOCUMENTS

| 4,531,308 A | 7/1985 | Neilson et al. |
| 5,011,648 A | 4/1991 | Garver et al. |
| 5,199,184 A | 4/1993 | Rosse |
| 5,590,479 A * | 1/1997 | Ruf et al. ..................... 34/587 |
| 5,708,125 A * | 1/1998 | Liedloff et al. ............. 528/310 |
| 2004/0143034 A1* | 7/2004 | Primke et al. .............. 523/176 |

FOREIGN PATENT DOCUMENTS

| DE | 39 28 360 A1 | 3/1981 |
| DE | 195 00 383 A1 | 7/1986 |
| DE | 36 07 412 A1 | 9/1986 |
| DE | 196 15 937 C1 | 7/1997 |
| DE | 198 15 129 A1 | 10/1999 |
| JP | 55-154113 | 12/1980 |
| WO | WO00/56510 | 9/1900 |
| WO | WO99/61220 | 12/1999 |

* cited by examiner

*Primary Examiner*—Terressa Boykin
(74) *Attorney, Agent, or Firm*—Buchanan Ingersoll & Rooney PC

(57) ABSTRACT

Methods are disclosed herein to reduce and/or eliminate agglomerations and deformations of pellets comprised of crystallizable thermoplastic polymer material during a crystallization or crystallization of the pellets. As described herein, polymer material is subjected to one or more conditioning steps prior to crystallization, in which a controlled moisture content and/or controlled moisture profile is set in the material, or in which the polymer material was obtained via solidification from a polymer melt in such a way that the polymer material has a defined initial moisture profile before the crystallization step

29 Claims, 3 Drawing Sheets

CONTROLLING THE CRYSTALLIZATION OF POLYESTERS BY MEANS OF THEIR WATER CONTENT

CROSS REFERENCE TO RELATED APPLICATIONS

This application claims priority under 35 U.S.C. §119 to German Application No. 101 49 474.2 filed in Germany on 8 Oct. 2001, and as a continuation application under 35 U.S.C. §120 to PCT/CH02/00504 filed as an International Application on 12 Sep. 2002 designating the U.S., the entire contents of which are hereby incorporated by reference in their entireties.

BACKGROUOND

Polyesters like polyethylene terephthalate, polyethylene naphthalate, etc., were obtained via synthesis in the melt. The solid polyester or copolyester material obtained from the melt via solidification is primarily present in amorphous form in ensuing processes like injection molding, extruding or thermoforming into fibers or articles like bottle preforms, wherein the material properties, e.g., moisture, molecular weight or crystallinity, are modified in intermediate processes, e.g., granulation, storage, crystallization, drying or solid-phase post-condensation, are often modified arbitrarily or non-arbitrarily purely at random.

In order to better execute the intermediate processes, polyester materials obtained from melt synthesis or recycled via melting are first solidified in the form of granulates or strands and strips. Conversion into a solid form can here take place after the polymer material has solidified, as in strand pelletization, or from the still liquid state with subsequent solidification, as during tablet fabrication or in a prill tower. Solidification can take place under water or in a gas medium like vapor, air or nitrogen.

The granulate is usually stored in a silo or in sacks under uncontrolled conditions, in which the retention time, temperature or relative humidity are random. In this time, the hygroscopic polyester material can uncontrollably absorb moisture or dry out, depending on the environment.

Drying and solid-phase post-condensation usually take place continuously in a shaft or in batches in a tumble dryer. The volatile molecules, e.g., water and ethylene glycol, are removed from the product in a tumble dryer via a vacuum, and in a shaft via a hot gas stream. Drying prevents a loss of molecular weight owing to hydrolysis if the material is again melted in an extruder. The solid-phase post-condensation results in better product properties due to an increase in molecular weight. Drying and solid-phase post-condensation normally take place over the temperature at which the material begins to crystallize, which results in a crystallization step.

Crystallization takes place at a temperature exceeding the glass transition temperature, wherein the granulate must be kept in motion to prevent adhesion or caking of the material. This is accomplished with a medium such as air, nitrogen, water or vapor in a fluidized bed, by a mechanical agitator or in a tumble dryer via rotation. In these crystallization processes, the chronological progression of the exposure temperature and exposure duration or retention time of the pellets in the crystallizer is subsequently set. Crystallization increases the adhesion point of the material, and prevents a caking or agglomeration of the material during a subsequent drying or solid-phase post-condensation.

The conditioning of synthetic materials, such as e.g. polyester materials, is known per se. For instance, DE-196 15 937 C1 describes a process for conditioning synthetic material parts, which are capable of absorbing water to decrease the brittleness of these synthetic materials, so that they are not damaged when installed in a machine, such as e.g. an automobile. U.S. Pat. No. 4,531,308 and DE 198 15 120 A1 in each case describe a process for drying a polymer granulate, which is then melted and transformed. P 55 154 113 A describes a process, in which an amorphous polyester granulate is moved in a tank with a stirrer and supplied with hot air to cause crystallisation. All of the aforementioned documents are incorporated herein by reference.

However, it has been shown that, careful temperature regulation notwithstanding, several pellets can become agglomerated and/or deformed even to the point where the pellets burst in the crystallizer. These agglomerations and deformations during crystallization appear to be facilitated by inexpedient conditions during granulate formation and/or improper storage of the granulate before crystallization.

SUMMARY

Methods are disclosed herein to reduce and/or eliminate agglomerations and deformations of pellets comprised of crystallizable thermoplastic polymer material during a crystallization or crystallization of the pellets.

As described herein, polymer material is subjected to one or more conditioning steps prior to crystallization, in which a controlled moisture content and/or controlled moisture profile is set in the material, or in which the polymer material was obtained via solidification from a polymer melt in such a way that the polymer material has a defined initial moisture profile before the crystallization step.

It is generally known that water generally triggers a nucleation effect in polyesters and polymers, which can have an influence on the crystallization behavior. It was surprisingly found that setting the moisture content and/or the moisture profile of the material can significantly influence its subsequent crystallization, and hence properties like propensity toward adhesion or deformation. Even the reaction rate of a possible further solid-phase post-condensation can be influenced in this way. In those areas of the polymer material with high moisture, for example, this yields numerous small crystals relatively quickly, but at a lower condensation rate in a subsequent solid-phase post-condensation, while those areas of the polymer material with a lower moisture form large crystals relatively slowly, but a higher condensation rate in a subsequent solid-phase post-condensation can be expected.

The polymer material can be a polycondensate like polyester or polyamide, e.g., polyethylene terephthalate, polyethylene naphthalate, polybutylene terephthalate or copolymers thereof, wherein these can have been obtained from new material and/or also from recycled material.

Each conditioning step can take place in a medium with a certain water content at a specific temperature over a specific period of time. This enables a targeted diffusion into the polymer material (moistening) or out of it (drying). As a result, a defined moisture distribution is obtained in the polymer material after conditioning.

The polymer material can have a non-defined moisture content and/or a non-defined moisture profile before conditioning. At least one step for conditioning the material is a step for moistening the polymer material or a step for drying the polymer material, wherein the conditioning in particular involves a step for preliminary drying. This makes it possible to generate largely known initial conditions for further conditioning, for example given a starting material with an unknown moisture content and/or unknown moisture distribution.

In an advantageous embodiment of a method disclosed herein, the moistening step takes place for 0.5 minutes (min) to 4 hours (h), preferably 2 min to 30 min, under water in water vapor under constant conditions in terms of temperature and pressure, or for 15 min to 72 h, preferably 4 h to 24 h, in a moist gas under constant conditions relative to temperature and moisture quantity.

In another advantageous embodiment of the method, the preliminary drying step takes place for 1 min to 72 h, preferably for 30 min to 24 h, in a dry gas stream under constant conditions relative to temperature and residual moisture quantity, or under a vacuum under constant conditions relative to temperature and pressure.

It is also expedient to execute a step for conditioning at a temperature below the crystallization temperature of the polymer material.

The polymer material can also be obtained via solidification from a polymer melt in such a way that the polymer material has a defined initial moisture profile before the crystallization step. This eliminates the need for a preliminary drying or preliminary moistening before the actual conditioning.

In particular, the defined initial moisture profile of the polymer material can proceed in such a way that the surface of the polymer material has a lower water content and the center has a higher water content. It is also possible for the defined initial moisture profile of the polymer material to proceed in such a way that the polymer material has a constant moisture profile from the surface to the center. The defined initial moisture profile of the polymer material can also proceed in such a way that the surface of the polymer material has a higher water content, and the center has a lower water content. The lower water content in the center can be locally constant, for example, wherein the surface with the higher water content preferably extends by a maximum of 20% of the path from the surface to the center into the polymer material. All of these settings of the moisture profile take place relatively quickly at sufficiently high conditioning temperatures. The inhomogeneous moisture distributions can hence offset undesired diffusion processes, in particular of water molecules, in the polymer material during its storage. It might also be said that storing the polymer material under specific conditions (temperature, water content of air, storage duration) is regarded as part of conditioning, so that the desired moisture distribution is present in the material under defined conditions after storage.

Subsequent crystallization of the polymer material preferably takes place in a hot gas stream.

The conditioning steps can take place continuously, wherein a step for drying, solid-phase post-condensation or solid-phase polyaddition takes place in particular after the crystallization step.

BRIEF DESCRIPTION OF THE DRAWINGS

Other advantages, features and possible applications can be gleaned from the following description, as well as from examples 1 and 2 based on the drawings, wherein.

DETAILED DESCRIPTION

Figure 1:
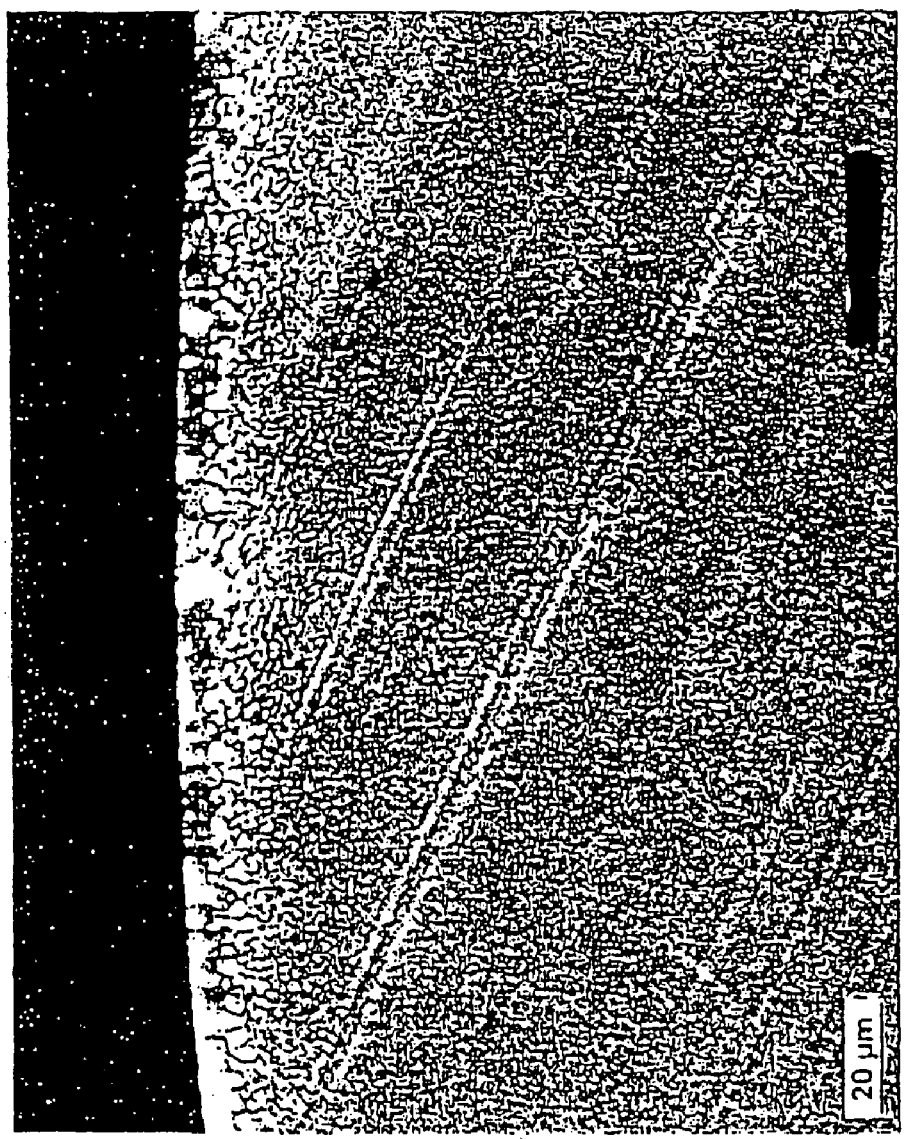
FIG. 1 shows a polarization microscope sectional view of the crystal structure of a sample in a first test.

An exemplary method is disclosed for treating crystallizable polymer material as a new material or recycled material, in particular polyester materials like PET or RPET, with the following steps: Introduction of the polymer material in a first reaction chamber, wherein it is temporarily present as a melt in the first reaction chamber; molding and cooling the melted polymer material into units of solidified polymer material; introduction of the solidified polymer material into a second reaction chamber for setting the moisture content and/or moisture distribution of units of solidified polymer material; and introduction of the polymer material into a third reaction chamber for crystallizing the solidified polymer material of the units.

Before setting the moisture content of the units of solidified polymer material in the second reaction chamber, for example, the water is removed from the melted polymer material in the first reaction chamber to a specific residual water content, by exposing the molded and solidified units of polymer material to a medium with a specific moisture content and specific temperature for a specific period of time in the second reaction chamber, e.g., for setting the moisture content and/or moisture distribution of the units of solidified polymer material. Water is removed from the melted polymer material in the first reaction chamber via vacuum melt degassing, for example. The medium with the specific moisture content and specific temperature can be a hot water bath, e.g., pressurized and kept at temperatures exceeding 100° C., or the medium is an atmosphere with superheated water vapor.

The first reaction chamber can be the process space of a polycondensation reactor, or extruder, in particular a ring extruder. The melted polymer material at the extruder end can be molded into one or more strands, for example, which are then cooled and solidified. The strands are cooled and solidified as they enter the second reaction chamber using the aforementioned medium, for example. The one or more strands are continuously conveyed through the second reaction chamber, for example, wherein the strands are guided in particular in such a way as not to contact each other. For example, the strands are cut into pellets after passing through the second reaction chamber, or they are granulated or pulverized after passing through the second reaction chamber.

The strand diameter, temperature of the medium, moisture content of the medium, and duration of exposure of the strands to the medium are selected for setting the moisture content of the strands in such a way as to yield a homogeneous moisture distribution over the entire strand volume. The melted polymer material can also be cut into one or more strands at the extruder end, which are then cooled and solidified, wherein the pellets are also cooled and solidified here while entering the second reaction chamber by the medium. In this case, the pellets are continuously conveyed through the second reaction chamber, and preferably in such a way as to only briefly contact each other, if at all. The medium is here continuously moved and mixed. The movement of the medium makes it possible to swirl the pellets in the medium.

As with the strands, the pellet size, temperature of the medium, moisture of the medium and the duration of exposure of the pellets to the medium are selected for setting the moisture content of the pellets in such a way as to yield a homogeneous moisture distribution over the entire pellet volume, or yield a inhomogeneous moisture distribution in the pellet volume. The selected duration of exposure of the pellets to the medium can also be smaller than the duration of exposure necessary for achieving a uniform moisture distribution in the pellets.

The temperature of the medium and/or the moisture content of the medium are changed, for example, during exposure to the medium in the second reaction chamber in such a way as to yield a more or less intensively moistening character or a more or less intensively dehumidifying character of the medium. In particular, the parameters temperature and water content of the medium are changed during exposure in such a way that the medium moistens at the beginning of exposure and dehumidifies toward the end of exposure, or that the medium dehumidifies at the beginning of exposure and moistens at the end of exposure. The processing step in the second reaction chamber can either take place in batches, wherein the change in parameters of the medium occurs over time during exposure, or continuously, wherein the change in parameters of the medium occurs locally during exposure along the path of the pellets through the second reaction chamber.

The third reaction chamber can be the process space of a crystallizer, in particular a multi-box crystallizer. The step of crystallizing in the third reaction chamber can be followed by another step for drying or solid-phase post-condensation in a fourth reaction chamber, which can be the process space of a solid-phase post-condensation reactor, in particular a shaft reactor.

EXAMPLE 1

In three different experiments, approx. 250 g of polyethylene terephthalate granulate in an amorphous state were filled into a cylindrical shaft reactor with a diameter of 80 mm on a punched screen and then heated up and thoroughly crystallized with a downwardly directed stream of hot nitrogen.

The granulate has a diameter of 2 mm and a length of 2.8 mm; the bulk density was 750 kg/m$^3$; the melting point was 254° C. (determined in the DSC at 10° C./min); the intrinsic viscosity (IV) was 0.64 dl/g.

Before being heated, the granulate was pretreated in various ways to generate different moistures and moisture profiles. In the first test, the granulate was placed in water for one week, and had a measured moisture of 11% before being crystallized. In the second test, the granulate was left in the ambient air for 2 to 3 weeks and had a moisture of 0.453%. In the third test, the granulate was dried over 60 hours at 60° C. under dried nitrogen and had a moisture of 0.015%.

Figure 2:
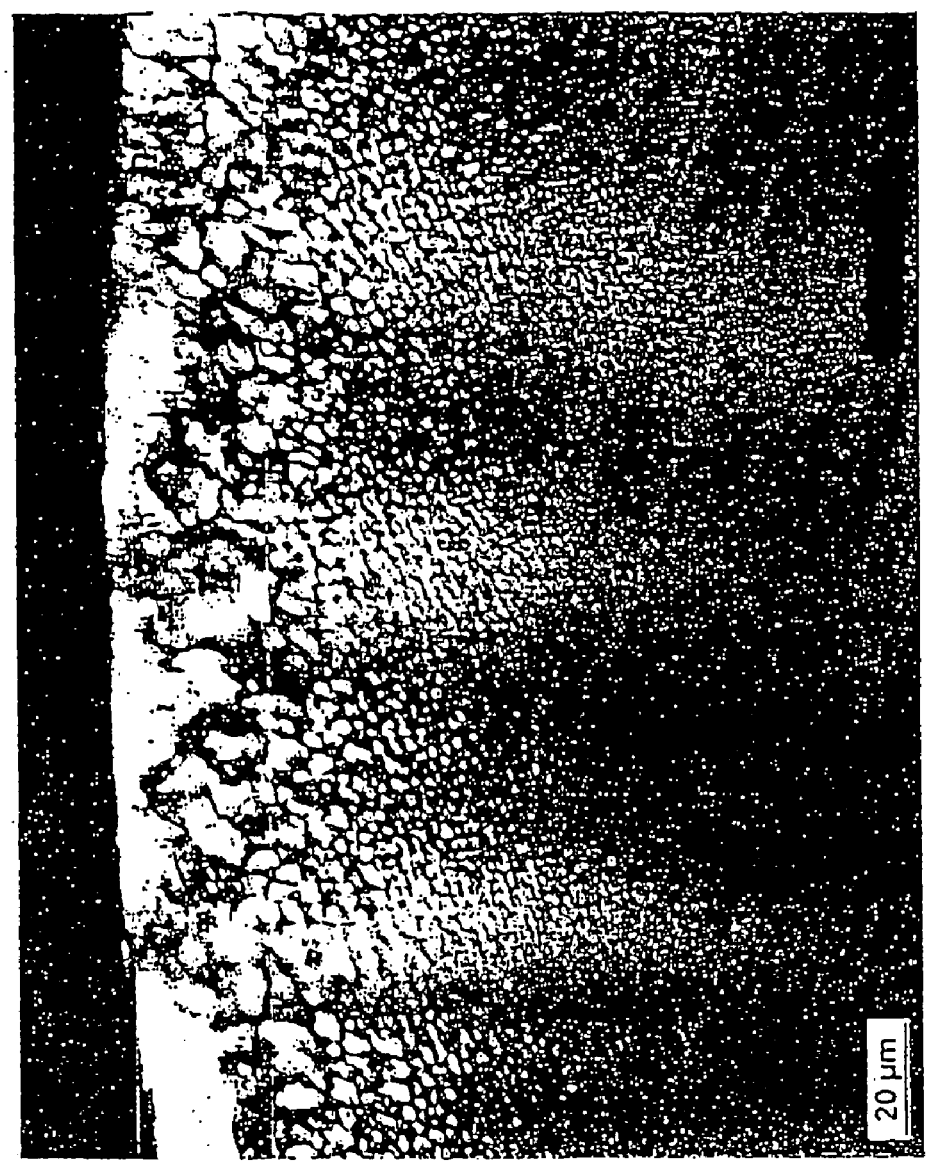
FIG. 2 shows a polarization microscope sectional view of the crystal structure of a sample in a second test.
Figure 3:
FIG. 3 shows a polarization microscope sectional view of the crystal structure of a sample in a third test.

In all three tests, the granulate was crystallized at 170° C. gas temperatures for 45 minutes. A sample was then taken, and a thin 3 μm layer of granulate was prepared. The crystal structure was observed under a polarization microscope. The sample from the first test (FIG. 1) revealed a uniform, but invisible, small spherulite size of <1 μm inside the granulate. Only at the edge is a thin shell with spherulites of <5 μm visible. The sample from the second test (FIG. 2) had a similar structure with slightly larger spherulites of up to 10 μm on the edge. Surprisingly, the sample from the third test (FIG. 3) had a uniform, much coarser spherulite structure of up to 20 μm right through the granulate.

EXAMPLE 2

The crystallized granulate of the three tests in Example 1 was further heated to 210° C. in the shaft reactor, so that a solid-phase post-condensation took place. Samples were taken after 8 and 24 hours to measure the intrinsic viscosity (IV) and melting behavior in the DSC at 10° C./min.

The results are summarized in the table presented below. The granulate from the last test with the lowest moisture had the highest IV rise and the lowest melting behavior of all three tests.

| Preliminary treatment & moisture [–] | SSP behavior | | Melting behavior | | | |
|---|---|---|---|---|---|---|
| | IV after 8 h [dl/g] | IV after 24 h [dl/g] | Beginning (onset) after 24 h [° C.] | Peak after 24 h [° C.] | End after 24 h [° C.] | Energy after 24 h [° C.] |
| 1 week in water, 11% moisture | 0.849 | 1.18 | 238.2 | 245.3 | 267.0 | 58.5 |
| 2–3 weeks in ambient air, 0.453% moisture | 0.849 | 1.17 | 239.1 | 246.3 | 268.1 | 56.3 |
| 60 hours at 60° C. dried, 0.015% moisture | 0.869 | 1.20 | 238.2 | 244.7 | 263.5 | 56.1 |

EXAMPLE 3

A granulate from the same raw product as in Example 1 was placed in a type 821 E Mettler differential scanning calorimeter (DSC) and subjected to various preliminary treatments to generate different moistures and moisture profiles before subsequently heating up the granulate at 10° C./min in the DSC to determine the crystallization behavior and melting behavior.

In the preliminary treatment, all three granulates were first dried at 65° C. for 72 hours in nitrogen in the DSC. In the first test, the granulate was then placed for 10 minutes in boiling water, allowing it to absorb lots of water without visibly crystallizing. In the second test, the granulate was placed in boiling water for only 1 minute, so it could only absorb water on the outer edge. In the third test, the crystallization and melting behavior was measured immediately after drying, practically without any water.

The results are summarized in the table below. As moisture dropped, crystallization began at a steadily rising temperature, and the peak was shifted toward higher temperatures. As moisture dropped, the beginning, peak and end of melting became shifted toward lower temperatures, as with the melting energy.

| Preliminary treatment [–] | Crystallization behavior | | | Melting behavior | | | |
|---|---|---|---|---|---|---|---|
| | Beginning [° C.] | Peak [° C.] | Energy exothermic [J/g] | Beginning (onset) [° C.] | Peak [° C.] | End [° C.] | Energy endothermic [J/g] |
| 72 h at 65° C. & 10 minutes in | 99 | 133.8 | 17.6 | 239.4 | 254.0 | 274.2 | 37.2 |

-continued

| Preliminary treatment [-] | Crystallization behavior | | | Melting behavior | | | |
|---|---|---|---|---|---|---|---|
| | Beginning [° C.] | Peak [° C.] | Energy exothermic [J/g] | Beginning (onset) [° C.] | Peak [° C.] | End [° C.] | Energy endothermic [J/g] |
| boiling water 72 h at 65° C. & 1 minute in boiling water | 111 | 142.2 | 24.1 | 241.2 | 253.3 | 268.8 | 34.7 |
| 72 h at 65 ° C. | 135 | 150.6 | 28.4 | 238.3 | 252.9 | 267.3 | 33.5 |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for crystallizing an at least partially amorphous, thermoplastic polymer material obtained by solidification from a polymer melt in the form of a granulate, strands or strips, comprising:
   conditioning a polymer material at a temperature below a crystallization point of the polymer material immediately after solidification to set a controlled moisture content and/or a controlled moisture profile in the polymer material prior to crystallization; and
   crystallizing the polymer material using said controlled moisture content and/or controlled moisture profile in the material.

2. The method according to claim 1, wherein the polymer material is a polycondensate.

3. The method according to claim 2, wherein the polymer material is a polyethylene terephthalate, polyethylene naphthalate, polybutylene terephthalate or copolymers thereof, wherein the latter was obtained from new material and/or recycled material.

4. The method according to claim 1, wherein each conditioning step takes place in a medium with a specific water content at a specific temperature over a specific period of time.

5. The method according to claim 1, wherein the polymer material is introduced in a medium for conditioning immediately after solidification.

6. The method according to claim 1, wherein the polymer material has a non-defined moisture content and/or a non-defined moisture profile before conditioning.

7. The method according to claim 1, wherein the conditioning step includes a step for moistening the polymer material.

8. The method according to claim 7, wherein the conditioning step involves preliminary drying.

9. The method according to claim 8, wherein the moistening step takes place for 0.5 mm to 4 h, under water in water vapor under constant conditions in terms of temperature and pressure.

10. The method according to claim 6, wherein the conditioning step includes drying the polymer material.

11. The method according to claim 10, wherein the preliminary drying step takes place for 1 mm to 72 h, in a dry gas stream under constant conditions relative to temperature and residual moisture quantity.

12. The method according to claim 1, wherein the polymer material is converted into a granulate, strand or strip.

13. The method according to claim 12, wherein the polymer material is converted into a granulate after being solidified.

14. The method according to claim 12, wherein the polymer material is converted from a still liquid state into a granulate form and then solidified.

15. A method for crystallizing a partially amorphous, thermoplastic polymer material comprising:
   solidifying a polymer melt into a polymer material in the form of a granulate, strands or strips;
   conditioning the polymer material at a temperature below a crystallization point of the polymer material immediately after the solidifying to have a defined initial moisture profile before crystallizing the polymer material; and
   crystallizing the polymer material.

16. The method according to claim 15, wherein a surface of the polymer material has a lower water content, and a center has a higher water content before the polymer material is crystallized.

17. The method according to claim 15, wherein the polymer material has a constant moisture profile from a surface to a center thereof before the polymer material is crystallized.

18. The method according to claim 15, wherein a surface of the polymer material has a higher water content, and a center of the polymer material has a lower water content before the polymer material is crystallized.

19. The method according to claim 18, wherein the lower water content in the center is locally constant.

20. The method according to claim 19, wherein the surface with the higher water content extends by a maximum of 20% of a path from the surface to the center into the polymer material.

21. The method according to claim 15, wherein the polymer material is crystallized in a hot gas stream.

22. The method according to claim 1, wherein the conditioning steps take place continuously.

23. The method according to claim 1 wherein the crystallization step is followed by a solid-phase post-condensation or solid-phase polyaddition step.

24. Method according to claim 1, wherein the polymer material is a polyester or a polyamide.

25. The method according to claim 8, wherein the moistening step takes place for 2 mm to 30 mm, under water in water vapor under constant conditions in terms of temperature and pressure.

26. The method according to claim 8, wherein the moistening step takes place for 15 mm to 72 h, in a moist gas under constant conditions relative to temperature and moisture quantity.

27. The method according to claim 8, wherein the moistening step takes place for 4 h to 24 h, under water in water vapor under constant conditions in terms of temperature and pressure.

28. The method according to claim 10, wherein the drying takes place for 30 mm to 24 h, in a dry gas stream under constant conditions relative to temperature and residual moisture quantity.

29. The method according to claim 10, wherein the drying takes place under a vacuum under constant conditions relative to temperature and pressure.

* * * * *

UNITED STATES PATENT AND TRADEMARK OFFICE
CERTIFICATE OF CORRECTION

PATENT NO. : 7,193,032 B2 Page 1 of 1
APPLICATION NO. : 10/837571
DATED : March 20, 2007
INVENTOR(S) : Brent Allen Culbert et al.

It is certified that error appears in the above-identified patent and that said Letters Patent is hereby corrected as shown below:

Col. 7 line 65, change "mm" to --min-- (each occurrence);

Col. 8 line 21, change "mm" to --min-- (each occurrence);

Col. 9 line 4, change "mm" to --min-- (each occurrence);

Col. 9 line 8, change "mm" to --min--;

Col. 10 line 4, change "mm" to --min--.

Signed and Sealed this

Eighteenth Day of September, 2007

JON W. DUDAS
*Director of the United States Patent and Trademark Office*